US012221826B2

(12) United States Patent
Janick et al.

(10) Patent No.: US 12,221,826 B2
(45) Date of Patent: Feb. 11, 2025

(54) VERTICALLY STACKING PANEL DOOR WITH IMPROVED CURVED TRACK PORTIONS

(71) Applicant: CornellCookson, LLC, Mountain Top, PA (US)

(72) Inventors: James Janick, Shavertown, PA (US); Brandon Carl Smith, Wapwallopen, PA (US); Nathan John Janiczek, Nanticoke, PA (US)

(73) Assignee: CornellCookson, LLC, Mountain Top, PA (US)

( * ) Notice: Subject to any disclaimer, the term of this patent is extended or adjusted under 35 U.S.C. 154(b) by 0 days.

(21) Appl. No.: 17/751,566

(22) Filed: May 23, 2022

(65) Prior Publication Data

US 2023/0374836 A1 Nov. 23, 2023

(51) Int. Cl.
*E05D 15/20* (2006.01)
*E06B 3/44* (2006.01)
*E06B 3/92* (2006.01)

(52) U.S. Cl.
CPC .............. *E06B 3/927* (2013.01); *E05D 15/20* (2013.01); *E06B 3/44* (2013.01); *E05Y 2201/684* (2013.01); *E05Y 2201/688* (2013.01); *E05Y 2900/106* (2013.01)

(58) Field of Classification Search
CPC .. E06B 3/927; E06B 3/925; E06B 3/483–485; E06B 9/0638; E06B 9/0676; E05D 15/20; E05D 2015/225; E05D 15/165; E05Y 2201/684; E05Y 2900/106
See application file for complete search history.

(56) References Cited

U.S. PATENT DOCUMENTS

| | | | | | |
|---|---|---|---|---|---|
| 1,872,489 | A * | 8/1932 | Mitchell | E06B 9/0638 | 160/202 |
| 1,897,391 | A * | 2/1933 | Kelly | E05D 15/246 | 160/209 |
| 2,271,309 | A * | 1/1942 | Rowe | E05D 15/24 | 16/210 |
| 3,071,825 | A * | 1/1963 | Ferris | B65G 9/008 | 49/198 |

(Continued)

FOREIGN PATENT DOCUMENTS

| | | | | |
|---|---|---|---|---|
| CH | 343624 | A * | 12/1959 | |
| EP | 3159467 | A1 * | 4/2017 | E05D 15/24 |

(Continued)

OTHER PUBLICATIONS

International Search Report and Written Opinion mailed on Aug. 19, 2022 in corresponding PCT Application No. PCT/US2022/030593, 9 pages.

*Primary Examiner* — Catherine A Kelly
*Assistant Examiner* — Patrick B. Ponciano

(57) ABSTRACT

A track of a vertically stacking door includes a vertical track, a first curved track portion, a second curved track portion, a first horizontal track portion coupled to the first curved track portion, and a second horizontal track portion coupled to the second curved track portion. The first curved track portion and the second curved track portion are split off from the vertical track and the first curved track portion and the second curved track portion each comprises multiple radii of curvature.

6 Claims, 6 Drawing Sheets

(56) References Cited

U.S. PATENT DOCUMENTS

| | | | | | |
|---|---|---|---|---|---|
| 3,280,888 | A * | 10/1966 | Davis | E05D 15/262 | 160/192 |
| 3,334,375 | A * | 8/1967 | Hubbard | E05D 15/0608 | 16/97 |
| 3,618,656 | A | 11/1971 | Young | | |
| 4,379,478 | A | 4/1983 | Lichy | | |
| 4,538,661 | A * | 9/1985 | Henry | E05F 15/686 | 160/35 |
| 4,662,420 | A * | 5/1987 | Hirao | E06B 9/0638 | 160/35 |
| 4,807,685 | A * | 2/1989 | Losch | E06B 9/0676 | 160/36 |
| 4,838,331 | A * | 6/1989 | Kasai | E06B 9/0638 | 160/36 |
| 5,065,806 | A * | 11/1991 | Kondoh | E06B 9/0676 | 160/36 |
| 5,072,766 | A * | 12/1991 | Kondoh | E06B 9/0676 | 160/32 |
| 5,133,398 | A * | 7/1992 | Yang | E06B 9/0638 | 160/202 |
| 5,172,742 | A * | 12/1992 | Iwasaki | E06B 9/0638 | 160/32 |
| 5,685,355 | A * | 11/1997 | Cook | E06B 9/0638 | 160/202 |
| 6,527,035 | B2 * | 3/2003 | Hoofard | E05D 15/24 | 160/209 |
| 7,861,762 | B2 * | 1/2011 | Meichtry | E05D 15/24 | 160/205 |
| 8,468,751 | B2 * | 6/2013 | Williams | E05F 15/684 | 52/64 |
| 8,590,233 | B2 * | 11/2013 | Sprague | E05D 15/0652 | 52/243.1 |
| 8,869,450 | B2 * | 10/2014 | Balay | E05F 15/00 | 160/33 |
| 10,309,151 | B2 * | 6/2019 | Tseng | E05D 15/56 | |
| 10,465,383 | B2 * | 11/2019 | Dickson | E05D 15/0613 | |
| 11,927,055 | B2 * | 3/2024 | Janick | E05F 15/686 | |
| 2004/0211033 | A1 | 10/2004 | Mullet et al. | | |
| 2014/0290878 | A1 | 10/2014 | Balay et al. | | |
| 2017/0138118 | A1 * | 5/2017 | Wong | A62C 2/18 | |
| 2019/0203513 | A1 | 7/2019 | Brown et al. | | |
| 2019/0316399 | A1 * | 10/2019 | Sauve | E05F 15/681 | |
| 2022/0170303 | A1 | 6/2022 | Janick et al. | | |

FOREIGN PATENT DOCUMENTS

| | | | | |
|---|---|---|---|---|
| WO | WO-2004016892 | A1 * | 2/2004 | E05D 15/165 |
| WO | WO-2008012084 | A1 * | 1/2008 | E06B 3/44 |
| WO | WO-2008032541 | A1 * | 3/2008 | E05D 15/24 |

* cited by examiner

VERTICALLY STACKING PANEL DOOR WITH IMPROVED CURVED TRACK PORTIONS

BACKGROUND

Overhead doors can be used for a variety of applications. For example, overhead doors can be used as garage doors in residential locations or doors for bays and entrances to warehouses in commercial locations.

Some overhead doors can be pulled open through a counterbalance system that includes a motor, a torsion spring, a rotating shaft connected to the motor and torsion spring, and a cable/strap system that connects the bottom section of a door to the rotating shaft. Through the movement of the counterbalance system, the door moves along a track. Typically, the moving doors can be moved along a track as a single piece to lie horizontally with the floor along the track, as the sections of the door are connected by hinges. If a door includes door sections that are connected by hinges to assist in moving the doors along the track, then the design of the counterbalance system and the track alone provide the mechanism to open and close the door section.

DETAILED DESCRIPTION

Figure 1:
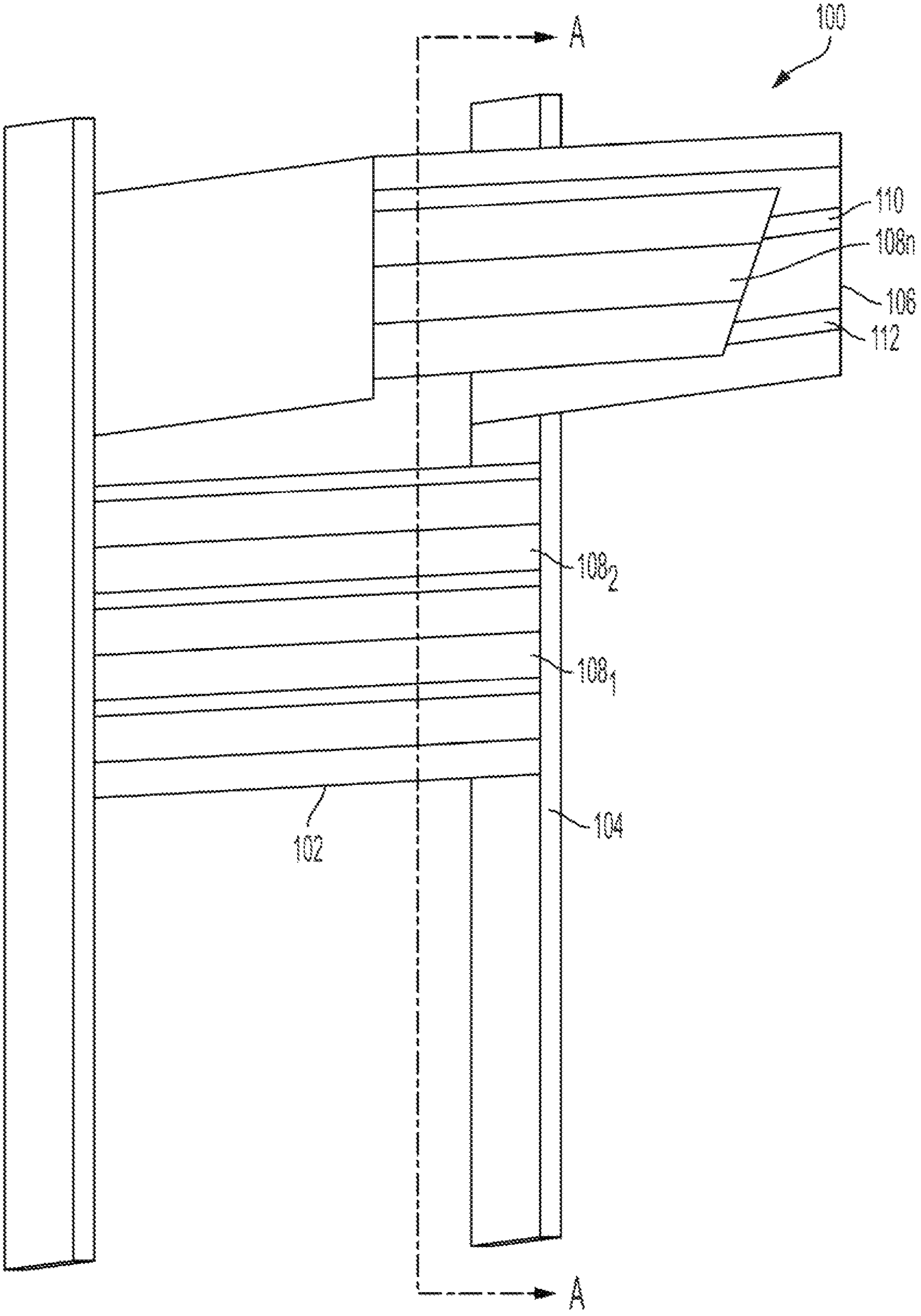
FIG. 1 illustrates an isometric view of an example of the vertically stacking panel door of the present disclosure.

Examples described herein provide examples of an improved track for panels of a vertically stacking panel door that is without hinged connections between each panel. As discussed above, currently available overhead doors are moved along a track by a counterbalance system. The door lies horizontally or parallel with the floor in a single piece.

However, there are some instances where customers would like to have less intrusion in the area above the floor where the overhead sectional door would rest when opened. For example, the overhead sectional door may limit the amount of intrusion into the garage, commercial loading dock, retail area, living space, and the like.

Since the panels are not connected by a plurality of hinges, there are portions during movement of the panels along a track where the panels can move independently of the other panels in the vertically stacking door. When the panels are opening or moving into a horizontal track to be stacked in an open position, the panels transition from the open position to closed position (and vice versa) by a track and the counter balance system. A challenge with having independently moving panels is that the panels may move too quickly into the horizontal track portion and upset the vertically stacking panel door system. The momentum of the panels may also cause large amounts of noise from banging into adjacent panels at a high speed when entering the horizontal track portion. Another challenge is that panels may move too slowly or smoothly when transitioning from an open position to a closed position.

When the vertically stacking panel door is being closed, the door may rely on gravity to assist panels to move along the horizontal track into a vertical track to stack vertically on top of one another. Any amount of friction within the track can cause a gravity-fed panel to get delayed or stuck in the track and prevent the vertically stacking panel door from closing properly.

A vertically stacking panel door that is without hinged connections between each panel requires careful consideration for the track system, and in particular for the portions of the track system including the curved track portion transitioning panels from ‘open’ to ‘closed,’ the associated gravitational forces, and any physical structures that could result in barriers to the descending movement of the panels under gravitational forces (gravity assist). It has been found that careful selection and design of the track structure improves the gravity assist function of the present vertically stacking panel door.

The present disclosure provides a vertically stacking panel door with an improved track to help address the issues noted above. For example, the improved track may include a curved track portion between a vertical track (also referred to as a vertical door guide) and a horizontal track (also referred to as a horizontal door guide) that includes multiple radii or multiple curvatures within the curved track portion. In other words, the curved track portion may include a single continuous piece of track having different radii along the path of the track to help control the momentum of each panel as the panels transition from the vertical track to the horizontal track. Thus, the amount of force and noise generated by the panels moving into the horizontal track can be reduced.

In addition, the improved track of the present disclosure removes any interference points within the track where rollers or wheels of the endcaps of the panels may travel. For example, the improved track may move all fasteners or connection points to areas outside of the track where rollers or wheels of the endcaps of the panels would travel. This may eliminate friction within the track and allow the panels to move more efficiently from the horizontal track to the vertical track with the help of gravity assist.

FIG. 1 illustrates an isometric view of an example vertically stacking panel door system 100 of the present disclosure. The vertically stacking panel door system 100 may include a door 102 that is comprised of a plurality of panels 108$_1$ to 108$_n$ (hereinafter also referred to individually as a panel 108 or collectively as panels 108). The door 102 may be opened by moving the panels 108 vertically along a track or track system. The track system may include different track portions that define a path of how the panels 108 may move to open and close the door 102.

In one embodiment, the track may include a vertical track 104, a panel interface zone comprise curved track portions, a first horizontal track portion 110 (also referred to herein as a first track 110) and a second horizontal track portion 112 (also referred to herein as a second track 112). The panel interface zone defines a transitional area between the vertical track 104 and a horizontal track 106. The panel interface zone provides the means to lift and separate the plurality of panels when the door 102 is opening and to align and place the plurality of panels in tangential connection when the door 102 is closing. As the panels 108 are separated, the panels 108 can be stacked along the horizontal track 106. As the panels 108 are aligned and tangentially connected, the panels 108 can be stacked in a vertical orientation along the vertical track 104.

In one embodiment, the panels 108 may include end caps (illustrated and discussed in further detail below) that include rollers or wheels that can move within the first track 110 and the second track 112. The first track 110 and the second track 112 may also be referred to herein as a top track 110 and a bottom track 112. The first track 110 and the second track 112 may be parallel to each other and may be positioned at a slight angle (e.g., from 1° to 15°) relative to the ground to allow for gravity assist when the door 102 is closing.

In one embodiment, the door 102 may be closed by moving the panels 108 towards the vertical track 104 one-by-one. The panels 108 may be stacked on top of one another as the door 102 is closed.

Figure 2:
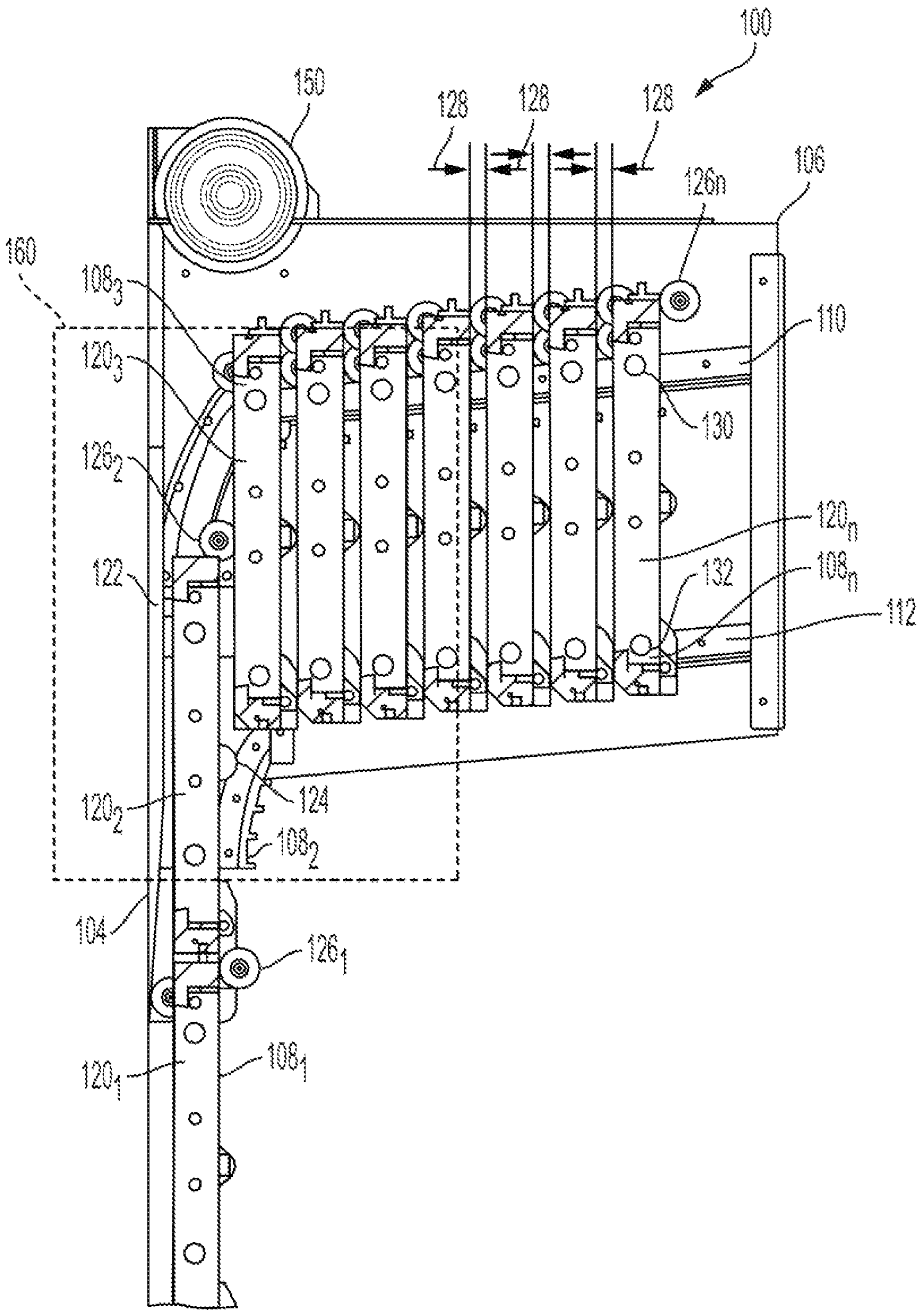
FIG. 2 is a cross-sectional side view of an example of the vertically stacking panel door of the present disclosure.

FIG. 2 illustrates a cross-sectional side view of the vertically stacking panel door system 100 along line A-A. FIG. 2 illustrates how the panels 108 are stacked vertically along the horizontal track 106. In one embodiment, the vertically stacking panel door system 100 may include a drum 150 as part of the counterbalance system. The drum 150 may be connected to a strap or cable (not shown) that is coupled to the bottom most panel 108 (e.g., panel $\mathbf{108}_1$ in FIG. 1). The drum 150 may be coupled to a motor and powered by the motor or may be manually operated to rotate. The drum 150 may further be connected to a torsion spring (not shown). When the drum 150 is operated to open the door 102, the drum 150 may pull the bottom most panel 108 up, with the torsion spring providing forces to assist in the pull. When the drum 150 is operated to close the door 102, the drum 150 may rotate in an opposite direction to apply tension to the torsion spring and to allow the bottom most panel 108 to descend through the panel interface zone and down the vertical track 104 into a closed position.

In one embodiment, each panel 108 may include end caps $\mathbf{120}_1$ to $\mathbf{120}_n$ (hereinafter also referred to individually as an end cap 120 or collectively as end caps 120). In one embodiment, each panel 108 may include an end cap 120 on both a left and right side of the panel 108. In other words, each side of the panel 108 adjacent to the track within the vertical track 104 may include an end cap 120.

Each end cap $\mathbf{120}_1$ to $\mathbf{120}_n$ may include a cam lever $\mathbf{126}_1$ to $\mathbf{126}_n$ (hereinafter also referred to individually as a cam lever 126 or collectively as cam levers 126) and track rollers 130 and 132. In one embodiment, the cam lever 126 may provide a mechanism to provide lift and separation between adjacent panels 108. As a panel 108 approaches the panel interface zone, the end cap 120 interacts with a track coupling 124 to mechanistically lift and separate a panel $\mathbf{108}_1$ from an adjacent panel $\mathbf{108}_n$. The cam lever 126 may also help guide the panel 108 to the first track 110 and the second track 112 of the horizontal track 106. The rollers 130 and 132 may fit in the track system and roll along the vertical track 104, a panel interface zone 160, and the horizontal track 106.

The vertical track 104 may include a ramp 122. The ramp 122 may provide an inclined surface that causes the cam lever 126 to rotate around an axis and lift an end of the cam lever 126 upwards to lift and separate a panel from an adjacent panel 108.

In one embodiment, the end caps 120 allow the panels 108 to be spaced evenly apart. For example, each panel 108 may be spaced apart by a distance 128 measured between surfaces of the adjacent panels 108 in the horizontal track 106. In addition, the end caps 120 may allow the panels 108 to be positioned parallel to one another in a vertical position. In other words, the panels 108 may be stacked such that the panel 108 are not angled towards one another or away from one another.

Figure 3:
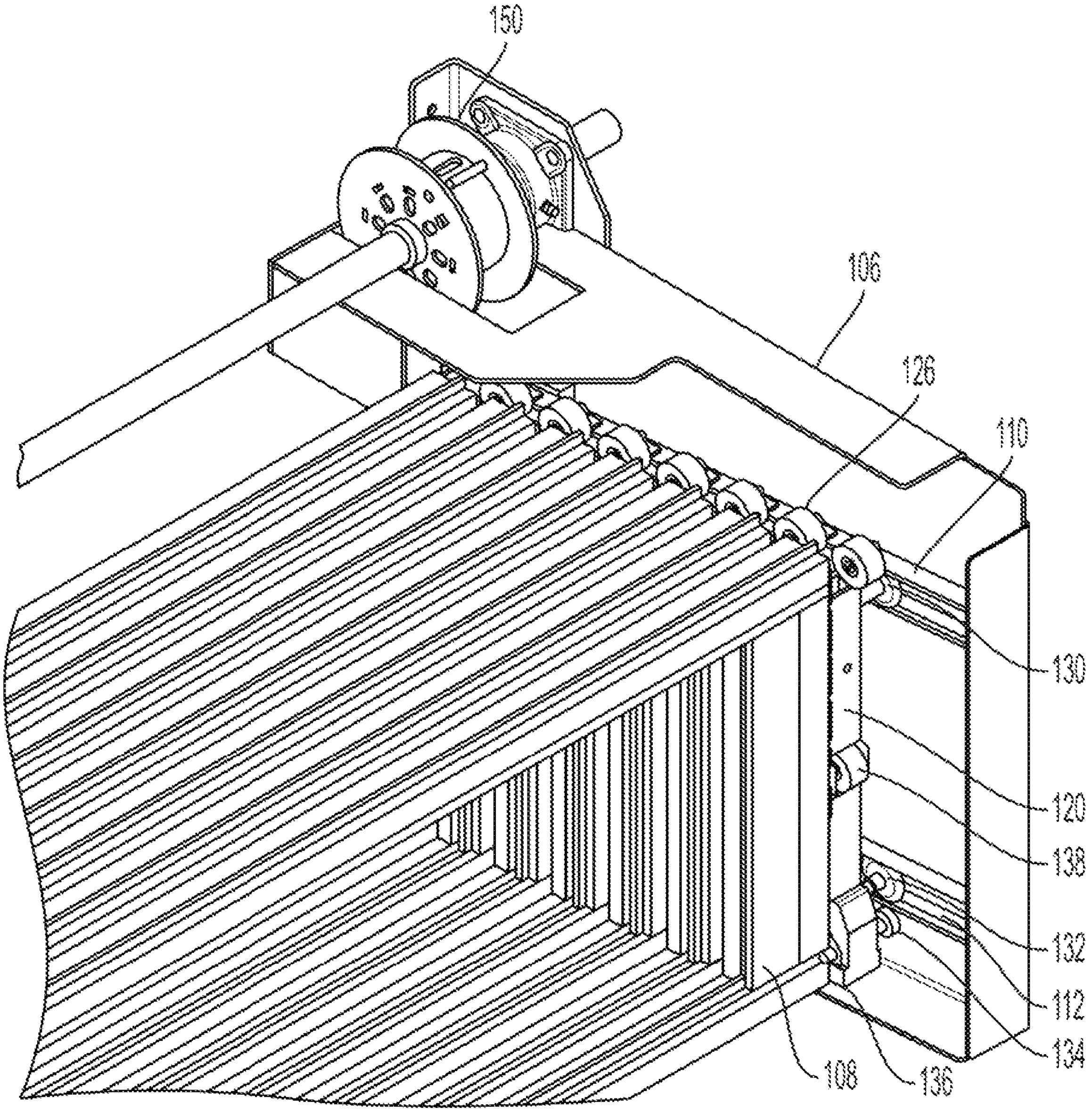
FIG. 3 is an isometric top view of example panels in a horizontal door guide of the present disclosure.

FIG. 3 illustrates an isometric top view of the panels 108 stacked in the horizontal track 106. FIG. 3 illustrates a first track wheel 130 and a second track wheel 132 of the end cap 120 positioned in the first track 110 and the second track 112, respectively. The end cap 120 may also include a third track wheel 134 that hangs freely when the panel 108 is stacked in the horizontal track 106.

In one embodiment, the end cap 120 may also include a cam surface 136 and a guide wheel 138. The cam surface 136 may be fabricated from a polymer or rubber material. The cam surface 136 may provide a desired spacing between the panels 108 in the horizontal track 106 (e.g., the spacing 128 illustrated in FIG. 2). The cam surface 136 may also provide noise dampening to reduce an amount of noise created by the panels 108 contacting one another as the door 102 is being opened and the panels 108 vertically stacked.

In one embodiment, the guide wheel 138 may provide support for an adjacent panel 108 during the process of the vertical stacking. The guide wheel 138 may roll up the front side of a panel 108 to keep the adjacent panel 108 in a parallel position rather than swinging at an angle towards an adjacent panel 108 that is moving up the vertical track 104 and into the track coupling 124.

In one embodiment, the cam surface 136 may be extended upwards to the middle of the end cap 120 to replace the guide wheel 138. For example, the guide wheel 138 may be removed, and the extended surface of the cam surface 136 may perform the same function as the guide wheel 138.

Although an example of an endcap 120 is illustrated in FIGS. 2 and 3, it should be noted that various designs for the endcap 120 may be deployed. For example, the endcap 120 may be a separate component that can be attached to each panel 108 or may be formed as part of the panel 108. The end cap 120 may provide a mechanism for the panel 108 to travel along the track system of the vertically stacking panel door system 100.

Figure 4:
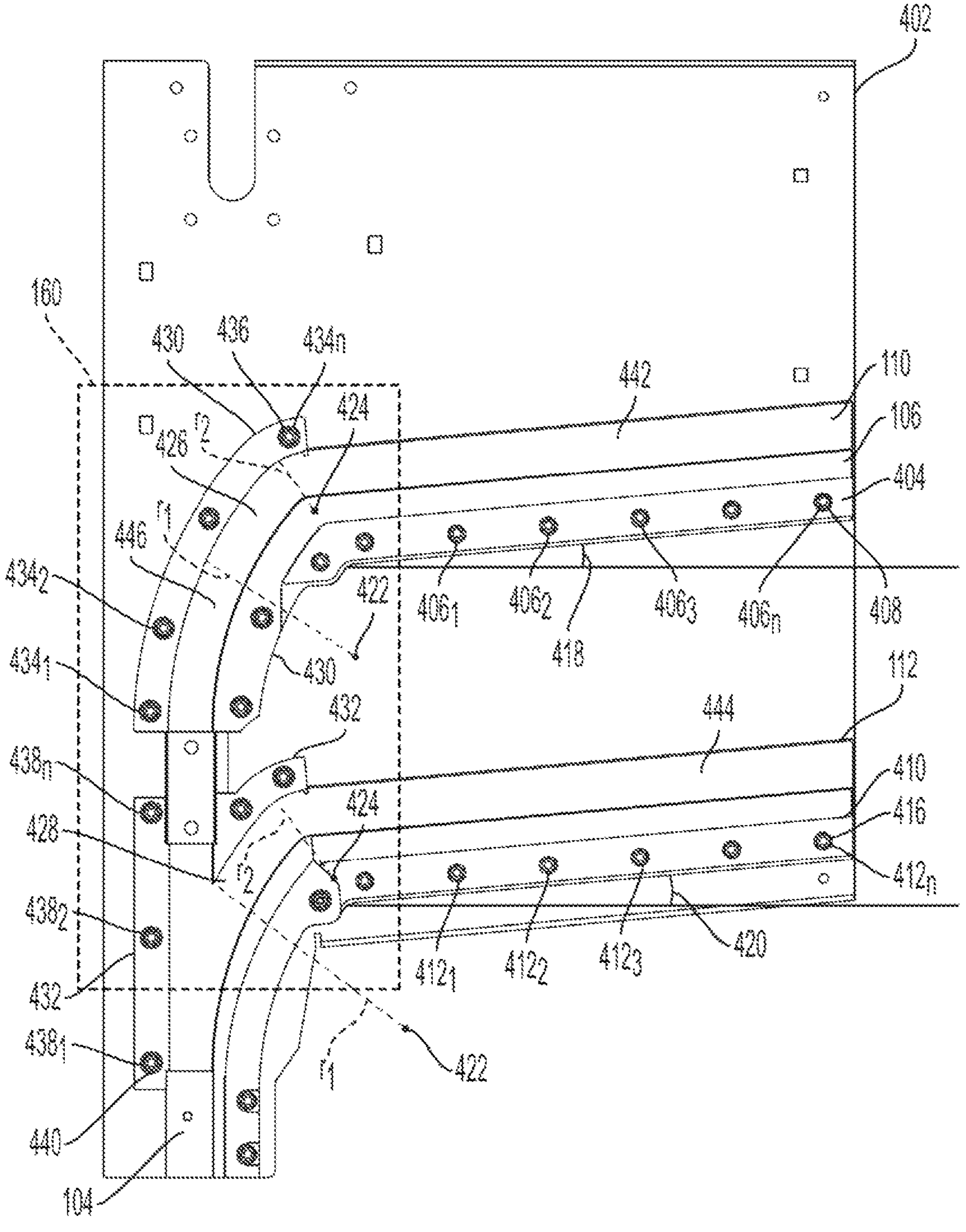
FIG. 4 is a side view of an example track of the present disclosure.

FIG. 4 illustrates a side view of an example track of the present disclosure. As discussed above, the panel interface zone 160 and the horizontal track 106 may be free from interference points or fasteners. In one embodiment, portions of the panel interface zone 160 that are not vertical (e.g., portions that are angled or horizontal) may be free from interference points or fasteners. Gravity may assist in ensuring that the panels 108 do not get stuck in portions of the panel interface zone 160 that are vertical. Optionally, vertical portions may have fasteners inside of the track without affecting the performance of the vertically stacking panel door system 100. In addition, the panel interface zone 160 may include curved track portions that include multiple radii of curvature along a path of the curved track portions.

In one embodiment, the horizontal track 106 may include the first track 110 and the second track 112, as described above. The first track 110 and the second track 112 may be slightly angled, as shown by respective angles 418 and 420. The angles 418 and 420 may be between 1° and 15°, such as 10°, 9°, 8°, 7°, 6°, 5°, 4°, 3°, 2°, and 1°, and may allow the door 102 to be closed using a gravity assist. Thus, when the drum 150 releases the up tension on the strap or cable or is rotated in a closing direction, the angles 418 and 420 may allow each panel 108 to controllably release and to move into the vertical track 104. In other words, the horizontal track 106 may allow gravity to assist the movement of the panels 108 through the panel interface zone 160 towards the vertical track 104 when the door 102 is closing.

In one embodiment, the first track 110 may include a flange 404. The flange 404 may include a plurality of openings $406_1$ to $406_n$ (hereinafter referred to individually as an opening 406 or collectively as openings 406). Each of the openings 406 may receive a fastener 408 to couple the first track 110 to a panel bracket 402. The fastener 408 may be any type of mechanical fastener, such as a screw, a nut and bolt, a pin and clip, and the like. The flange 404 may be located along an outer perimeter of the first track 110. Thus, the connection points for the first track 110 are located outside of an inner track surface 442.

As can be seen in FIG. 4, the inner track surface 442 of the first track 110 should be free of any changes in surface height, such as connection points, fasteners, interference points, and the like that can be above or below the surface of the inner track surface 442. Rather, the inner track surface 442 is relatively smooth to allow the track wheel 130 to freely move against the inner track surface 442 with minimal friction. Said another way, a delta in surface height between any two points along the inner track surface 442 should be less than 5 millimeters (mm). In one embodiment, the delta should be less than 1 mm. In one embodiment, the delta should be approximately zero. As a result, the likelihood of the panels 108 become stuck in the horizontal track 106 is minimized.

In one embodiment, the second track 112 may include a flange 410. The flange 410 may include a plurality of openings $412_1$ to $412_n$ (hereinafter referred to individually as an opening 412 or collectively as openings 412). Each of the openings 412 may receive a fastener 416 to couple the second track 112 to the panel bracket 402. The fastener 416 may be any type of mechanical fastener, such as a screw, a nut and bolt, a pin and clip, and the like. The flange 410 may be located along an outer perimeter of the second track 112. Thus, the connection points for the second track 112 are located outside of an inner track surface 444.

As can be seen in FIG. 4, the inner track surface 444 of the second track 112 does not include any connection points, fasteners, interference points, or the like. Rather, the inner track surface 444 is relatively smooth to allow the track wheel 132 to freely move against the inner track surface 444 with minimal frictions. As a result, the likelihood of the panels 108 become stuck in the horizontal track 106 is minimized.

Thus, the surfaces of the horizontal track 106 and the panel interface zone 160 that interact with track rollers 130 and 132 are devoid of perpendicular seams interrupting or fasteners extending from the inner surfaces 442, 444, and 446 of the track. The inner surfaces 442, 444, and 446 of the horizontal track 106 may comprise a single piece of material, such as a steel or polymeric injection molded component or may comprise multiple components fastened together externally. The single piece of material may comprise openings to receive fasteners that are located on an exterior flanges 404, 410, 430, and 432 relative to the inner surfaces 442, 444, and 446 that interact with the track rollers 130 and 132 of the panels 108.

FIG. 4 also illustrates further details of the panel interface zone 160. In one embodiment, the panel interface zone 160 may include a first curved track portion 426 and a second curved track portion 428 that each have multiple radii of curvature, as discussed above. The first curved track portion 426 and the second curved track portion 428 may be formed as a single piece. The first curved track portion 426 may include a flange 430 located around an outer perimeter (e.g., on one side or both sides) of the first curved track portion 426. The flange 430 may include a plurality of openings $434_1$ to $434_n$ (hereinafter also referred to individually as an opening 434 or collectively as openings 434) that may each receive a fastener 436. The fastener 436 may be any type of mechanical fastener, such as a screw, a nut and bolt, a pin and clip, and the like. Thus, the connection points for the first curved track portion 426 are located outside of an inner track surface 446.

The second curved track portion 428 may include a flange 432 located around an outer perimeter (e.g., on one side or both sides) of the second curved track portion 428. The flange 432 may include a plurality of openings $438_1$ to $438_n$ (hereinafter also referred to individually as an opening 438 or collectively as openings 438) that may each receive a fastener 440. The fastener 440 may be any type of mechanical fastener, such as a screw, a nut and bolt, a pin and clip, and the like. Thus, the connection points for the second curved track portion 428 are located outside of an inner track surface 446.

FIG. 4 also illustrates the multiple radii of curvatures of the first curved track portion 426 and the second curved track portion 428. In other words, the first curved track portion 426 may include a single non-simple open curve with two different curves or may have two different portions that have two different radii. The second curved track portion 428 may also include a single non-simple open curve with two different curves. The curves may be open curves, as opposed to closed curved structures. Said another way, the curves may be open in that the curves are formed along an outer edge of the first curved track portion 426 and the second curved track portion 428 rather than as a closed structure that is attached to the track portions.

As discussed above, the multiple radii of curvature design of the first curved track portion 426 and the second track portion 428 may provide a change in momentum of the panels 108 as the panels 108 move from the vertical track 104 to the horizontal track 106 when the door 102 is opened. The first radius may be larger than the second radius. The larger radius may cause a panel 108 to decelerate just before entering the first track 110 and the second track 112. As a result, the panels 108 may enter the first track 110 and the second track 112 with controlled momentum. This structure provides a smooth transition for opening and closing within the panel interface zone 160 of the vertical stacking panel door system 100, prevents damage to adjacent panels 108, and reduces the amount of noise generated from the panels 108 contacting one another in the horizontal track 106.

In one embodiment, the first curved track portion 426 may include a first curve or first curved portion that has a first radius of curvature $r_1$ that is measured from a center 422 of an imaginary circle formed by the first curve and a second curve or second curved portion that has a second radius of curvature $r_2$ that is measured from a center 424 of an imaginary circle formed by the second curve. The first curve and the second curve may be open curves. The first curve and the second curve are connected to form the multiple radii of curvature design.

Similarly, the second curved track portion 428 may include a first curve or first curved portion that has a first radius of curvature $r_1$ that is measured from a center 422 of an imaginary circle formed by the first curve and a second curve or a second curved portion that has a second radius of curvature $r_2$ that is measured from a center 424 of an imaginary circle formed by the second curve. The first curve and the second curve are connected to form the multiple radii of curvature design that is the same as the multiple radii of curvature design of the first curved track portion 426.

In one embodiment, the first radius of curvature $r_1$ may be selected to be as large as possible within the parameters of the size of the door 102, the size of the panels 108, and the size of the first track roller 130 and the second track roller 132. The large radius size of curvature $r_1$ may help to minimize angular acceleration when the panels 108 transition from vertical movement to horizontal movement. The amount of force and noise created by adjacent panels 108 entering the first horizontal track 110 and the second horizontal track 112 may be significantly reduced by controlling the speed via the size of the radius of curvature $r_1$.

In one embodiment, the second radius of curvature $r_2$ may be smaller than the first radius of curvature $r_1$. Said another way, the first radius of curvature $r_1$ is larger than the second radius of curvature $r_2$. The second radius of curvature $r_2$ may be sized to act as a staging area to hold individual panels 108 before the panels 108 enter into the first horizontal track 110 and the second horizontal track 112.

Without the second curve of the first curved track portion 426 and the second curved track portion 428 having the second radius of curvature $r_2$, the panels 108 would continue directly from the first curved track portion 426 having the first radius of curvature $r_1$. The panels 108 would move with momentum, albeit reduced by the first curve, into the first horizontal track 110 and the second horizontal track 112. This movement with momentum may disrupt the vertically stacking panel door system 100. Thus, the second curve allows the panels 108 to come to a rest before being moved into the first horizontal track 110 and the second horizontal track 112.

In one embodiment, the first radius of curvature $r_1$ may be approximately five to seven times larger than the second radius of curvature $r_2$. In one embodiment, the first radius of curvature $r_1$ may be approximately 10 to 15 inches. In one embodiment, the first radius of curvature $r_1$ may be approximately 13 inches. In one embodiment, the first radius of curvature $r_1$ may be approximately 12.938 inches.

In one embodiment, the second radius of curvature $r_2$ may be approximately 2 to 3 inches. In one embodiment, the second radius of curvature $r_2$ may be approximately 2 inches. In one embodiment, the second radius of curvature $r_2$ may be approximately 2.188 inches.

Figure 5:
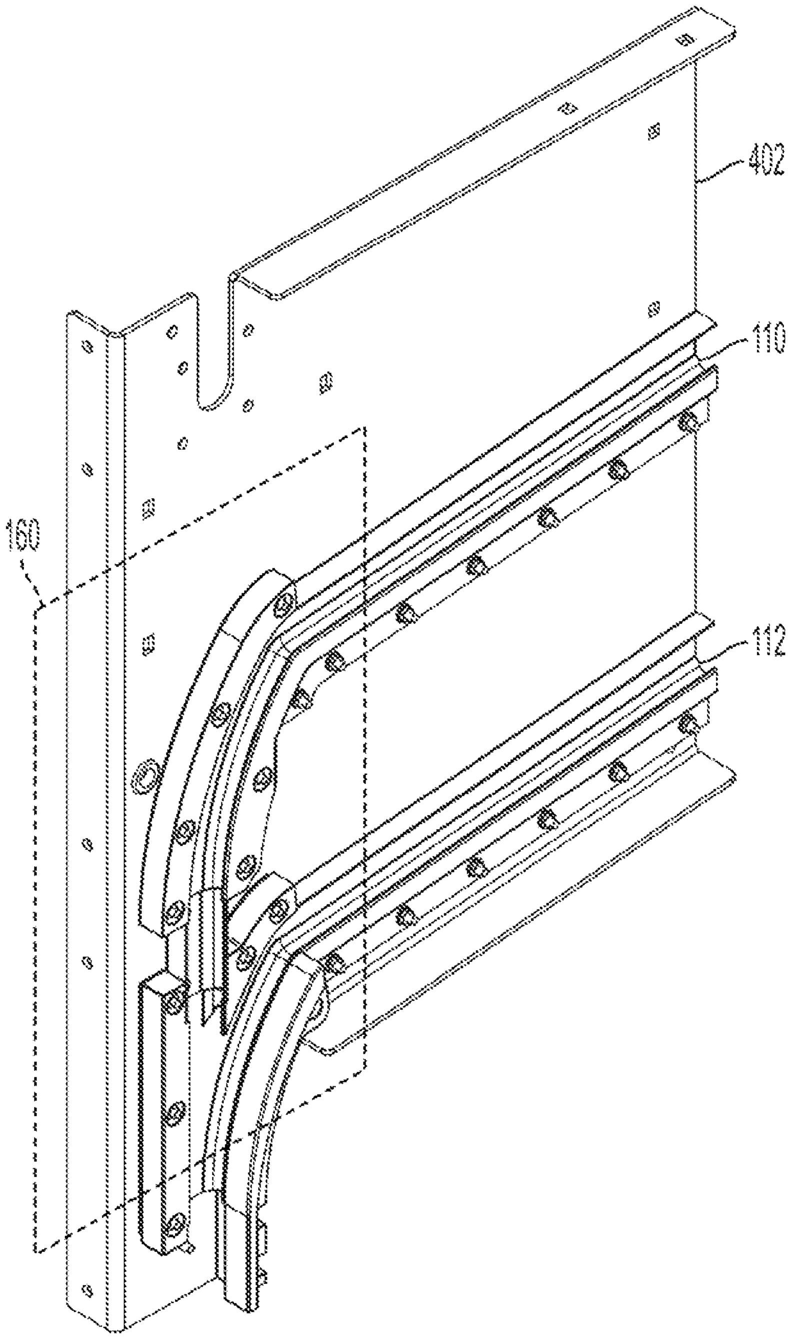
FIG. 5 is an isometric view of the example track of the present disclosure.

FIG. 5 illustrates a side isometric view of the first track 110, the second track 112, and the panel interface zone 160. It should be noted that the opposite side of the door 102 may include a mirror image of the first track 110, the second track 112, and the panel interface zone 160, as noted above.

Figure 6:
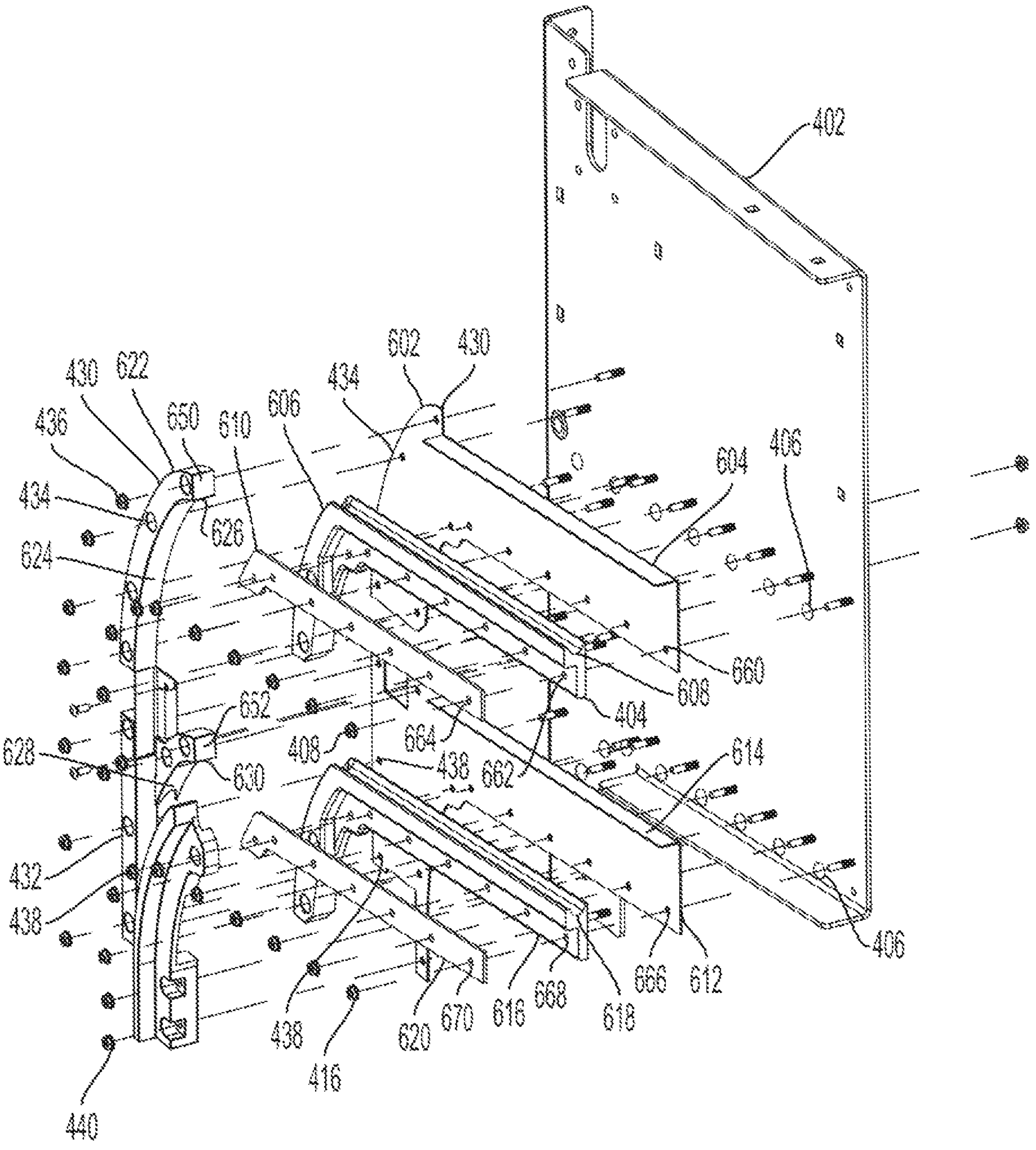
FIG. 6 is an exploded isometric view of the example track of the present disclosure.

FIG. 6 illustrates an isometric exploded view of the example track of the present disclosure. In one embodiment, the panel interface zone 160, the first track 110, and the second track 112 may be formed by a combination of several components to create the smooth inner surfaces 442, 444, and 446. In one embodiment, the components may be fastened together against the panel bracket 402.

In one embodiment, the first track 110 may be formed by a bracket 602, a lower track 606, and an outer plate 610. The bracket 602 may have an area that is generally smooth and flat and free of any changes in surface height, such as connection points, fasteners, interference points, and the like that can be above or below the inner surface 442. The bracket 602 may include a lip 604. The lip 604 may be an edge of the bracket 602 that is bent perpendicular or approximately 90 degrees to a plane, body, or smooth area of the bracket 602. The lip 604 may form the top guide of the first track 110. The bracket 602 may include the plurality of openings 660.

In one embodiment, the lower track 606 may include the flange 404. The lower track 606 may include a curved surface 608 that forms the lower guide of the first track 110. As noted above, the flange 404 may include the plurality of openings 662.

In one embodiment, the first track 110 may also include an outer plate 610. The outer plate 610 may be shaped similar to the flange 404. The outer plate 610 may also include a plurality of openings 664.

In one embodiment, the openings 654 of the outer plate 610, the openings 652 of the flange 404, the openings 650 of the bracket 602, and the openings 406 of the panel bracket 402 may be aligned. A fastener 408 may be inserted through a set of aligned openings 664, 662, 660, and 406 of the outer plate 610, the flange 404, the bracket 602, and the panel bracket 402, respectively, to secure the first track 110 against the panel bracket 402.

Similarly, the second track 112 may be formed by a bracket 612, a lower track 616, and an outer plate 620. The bracket 612 may have an area that is generally smooth and flat and should be free of any changes in surface height, such as connection points, fasteners, interference points, and the like that can be above or below the surface of the inner surface 444. The bracket 612 may include a lip 614. The lip 614 may be an edge of the bracket 612 that is bent perpendicular or approximately 90 degrees to a plane, body, or smooth area of the bracket 612. The lip 614 may form the top guide of the second track 112. The bracket 612 may include the plurality of openings 666.

In one embodiment, the lower track 616 may include the flange 410. The lower track 616 may include a curved surface 618 that forms the lower guide of the second track 112. As noted above, the flange 410 may include the plurality of openings 668.

In one embodiment, the second track 112 may also include an outer plate 620. The outer plate 620 may be shaped similar to the flange 410. The outer plate 620 may also include a plurality of openings 670.

In one embodiment, the openings 670 of the outer plate 620, the openings 668 of the flange 410, the openings 406 of the bracket 612, and the openings 666 of the panel bracket 402 may be aligned. A fastener 416 may be inserted through a set of aligned openings 666, 668, 670, and 406 of the outer plate 620, the flange 410, the bracket 612, and the panel bracket 402, respectively, to secure the second track 112 against the panel bracket 402.

In one embodiment, the first curved track portion 426 and the second curved track portion 428 of the panel interface zone 160 may be formed from a single piece 622. The single piece 622 may include surfaces 624, 626, 628, and 630 that form a top guide of the first curved track portion 426 and the second curved track portion 428. For example, the surface 624 may form a top guide of the curved portion with a first radius of curvature $r_1$ and the surface 626 may form a top guide of the curved portion with a second radius of curvature $r_2$ of the first curved track portion 426. The surface 628 may form a top guide of the curved portion with a first radius of curvature $r_1$ and the surface 630 may form a top guide of the curved portion with a second radius of curvature $r_2$ of the second curved track portion 428.

In one embodiment, the bottom guide may be formed by a back side of the lower track 606 and the lower track 616. The single piece 622 may be positioned such that an end 650 and an end 652 of the single piece 622 abuts against the lip 604 and the lip 614, respectively.

In one embodiment, the bracket 602 may include openings 434 that align with the openings 434 of the flange 430. The bracket 612 may include openings 438 that align with the openings 438 of the flange 432. The single piece 622 may be positioned such that the openings 434 of the flange 430 and the openings 438 of the flange 432 align with the openings 434 of the bracket 602 and the openings 438 of the bracket 612. A fastener 436 may be inserted into a set of aligned openings 434 and a fastener 440 may be inserted into a set of aligned openings 438 to secure the single piece 422 to the brackets 602 and 612, which are secured to the panel bracket 402.

As a result, the horizontal track 106 and the panel interface zone 160 may be secured with fasteners or connection points that are located outside of the inner track surfaces 442, 444, and 446. Thus, the first track 110, the second track 112, and the non-vertical portions of the panel interface zone 160 (e.g., the first curved track portion 426 and the second curved track portion 428) may be free from any fasteners or connections points located inside the inner track surfaces 442, 444, and 446. In other words, the inner track surfaces 442, 444, and 446 may be relatively flat and smooth with no openings or potential friction points.

Lastly, the tracks that guide the end caps 120 of the panels 108 may be improved to control the acceleration and/or velocity of each panel 108 that enters the horizontal portions of each track. As described above, the panel interface zone 160 may include a curved track portion that includes different curved portions having multiple radii of curvature. In other words, different portions of the curved track portion may have different radii of curvature.

In one embodiment, the first track 110, the second track 112, and the panel interface zone 160 may be fabricated from one or more materials. For example, the panel bracket 402, the bracket 602, the bracket 612, the outside bracket 610, and the outside bracket 620 may be fabricated from sheet metal, aluminum, steel, and the like. The single piece 622 of the panel interface zone 160, the lower track 606, and the lower track 616 may be fabricated from a plastic, polymer, metal, or a combination thereof.

Thus, the present disclosure provides an improved track system that reduces noise and forces of colliding panels 108 when the door 102 is opened. In addition, the improved track system provides a more efficient closing of the door 102 by using momentum from gravity along with specific structure selections in the multiple radii of curvature design of the panel interface zone 160 to control the momentum, while removing any potential disruptions to the momentum.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A vertical door guide for a vertically stacking door, comprising:
- a first vertical door guide; and
- a second vertical door guide, wherein the first vertical door guide and the second vertical door guide each comprises:
  - a vertical track;
  - a panel interface zone comprising a first curved track portion and a second curved track portion, wherein the first curved track portion and the second curved track portion each comprises a non-simple open curve with two different curves comprising a first curved portion having a first radius of curvature and a second curved portion having a second radius of curvature that is different from the first radius of curvature;
  - a first horizontal track portion coupled to the first curved track portion;
  - a second horizontal track portion coupled to the second curved track portion;
  - a first track bracket that provides inner surfaces for the first curved track portion and the first horizontal track portion, wherein the first track bracket further comprises:
    - a first lip to form a top part of an inner track of the first horizontal track portion; and
  - a second track bracket that provides inner surfaces for the second curved track portion and the second horizontal track portion, wherein the second track bracket further comprises:
    - a second lip to form a top part of an inner track of the second horizontal track portion.

2. The vertical door guide of claim 1, wherein the first track bracket, further comprises:
- a first plurality of openings along an outer perimeter to receive a first plurality of fasteners to couple the first track bracket to a first flange that defines the first curved track portion; and
- a second plurality of openings along the outer perimeter to receive a second plurality of fasteners.

3. The vertical door guide of claim 2, wherein the first horizontal track portion comprises:
- the first track bracket;
- a first lower track, wherein the first lower track comprises a plurality of openings in a second flange along an outer perimeter; and
- a first outer plate comprising a plurality of openings, wherein the plurality of openings of the first outer plate and the plurality of openings of the second flange are aligned with the second plurality of openings of the first track bracket to receive the second plurality of fasteners to couple the first lower track to the first track bracket.

4. The vertical door guide of claim 1, wherein the first radius of curvature is approximately 13 inches and the second radius of curvature is approximately 2 inches.

5. The vertical door guide of claim 1, wherein the second track bracket, further comprises:
- a third plurality of openings along an outer perimeter to receive a third plurality of fasteners to couple the second track bracket to a third flange that defines the second curved track portion; and
- a fourth plurality of openings along the outer perimeter to receive a fourth plurality of fasteners.

6. The vertical door guide of claim 5, wherein the second horizontal track portion comprises:
- the second track bracket;
- a second lower track, wherein the second lower track comprises a plurality of openings in a fourth flange along an outer perimeter; and
- a second outer plate comprising a plurality of openings, wherein the plurality of openings of the second outer plate and the plurality of openings of the fourth flange are aligned with the fourth plurality of openings of the second track bracket to receive the fourth plurality of fasteners to couple the second lower track to the second track bracket.

* * * * *